Patented Feb. 13, 1945

2,369,435

UNITED STATES PATENT OFFICE 2,369,435

HEAT TRANSFER COMPOSITION

Robert D. Coghill and Reid T. Milner, Peoria, Ill., assignors to Claude R. Wickard, as Secretary of Agriculture of the United States of America, and his successors in office No Drawing. Application September 22, 1942, Serial No. 459,274

2 Claims. (Cl. 252—73)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to heat transfer compositions and is directed more particularly to water containing 2,3-butylene glycol. It is common practice to add various freezing point depressants, such as alcohol and glycols, to the water used as the heat transfer medium, and circulated through heat transfer apparatus, such as motor vehicle radiators, hot water heating systems, gas meters, fire extinguishers and similar devices, in order to prevent freezing at lowered temperatures. Thus, for example, the use of 1,2-butylene glycol as a freezing point depressant is disclosed in U. S. Patent 1,213,368 to Hibbert and that of 1,3-butylene glycol in U. S. Patent 1,780,927 to Jordan.

The 2,3-butylene glycol available up to the present time has been the internally compensated or meso-isomer containing in some instances small quantities of optically active isomers. Since in aqueous media this 2,3-butylene glycol forms a pentahydrate having a melting point of 16.8° C., it is not suitable for use as a freezing point depressant in many systems using water as the heat transfer medium.

We have discovered that levorotatory 2,3-butylene glycol described in a copending application, Serial No. 459,290, filed September 22, 1942, now Patent No. 2,259,950, does not form a hydrate and is eminently suited as a freezing point depressant for use in aqueous heat transfer compositions. Levo-2,3-butylene glycol is a compound corresponding to the formula

CH$_3$—CHOH—CHOH—CH$_3$ and possessing substantially the following characteristics:

Specific rotation at
  25° C_____degrees__ −11.77 to −13.0
Refractive index at 25° C_____ 1.4307
Boiling point_____° C__ 177
Freezing point_____° C__ +19
Viscosity at 25° C__centipoises__ 41.0

The viscosity of levo-2,3-butylene glycol is approximately one-third that of the previously known meso-2,3-butylene glycol. This lower viscosity is a desirable property for the application of levo-2,3-butylene glycol in the compounding of heat-transfer compositions.

The freezing points of aqueous solutions of levo-2,3-butylene glycol and of meso-2,3-butylene glycol are given in the following table:

| Concentration of glycol in per cent by weight | Freezing point ° C. | |
|---|---|---|
| | Levo-2,3-butylene glycol | Meso-2,3-butylene glycol |
| 10 | −2.5 | −2 |
| 20 | −6 | +8.5 |
| 30 | −12 | +14.0 |
| 40 | −22 | +16.8 |
| 50 | −35 | +16.8 |
| 60 | −55 | +15.0 |
| 70 | −50 | +12.0 |
| 80 | −27 | +4.0 |
| 90 | −4 | +1.0 |
| 100 | +19 | +33.7 |

Levo-2,3-butylene glycol having the above characteristics can be produced from carbohydrate materials by a fermentation method described in the aforementioned application Serial No. 459,290. According to this method, carbohydrate materials such as grain mashes, sweetpotato mashes, or sugar solutions are inoculated with strains of Aerobacillus polymyxa and the microorganisms are cultivated on the substrates preferably under quiescent conditions and while maintaining the pH of the medium between 5.2 and 7.0. Upon completion of the fermentation process the levo-2,3-butylene glycol is recovered by any suitable procedure, for instance extraction and distillation.

Aqueous heat transfer compositions containing levo-2,3-butylene glycol as the freezing point depressant are characterized by the property of remaining fluid and mobile at very low temperatures and of being relatively non-volatile at ordinary temperature as well as at temperatures much higher than ordinary. They can be used in cooling and refrigerating systems, either singly or in combination with other freezing point depressant compositions and also with well known rust inhibiting agents such as for example alkali nitrites, triethanolamine and the like, whenever it is desired to inhibit the congelation of aqueous media at low temperatures. They are of especial value in cooling systems where the cooling agent is exposed to temperatures much above the ordinary as well as to temperatures below the freezing point of water, conditions which occur for example in cooling systems of internal combustion engines.

Having thus described our invention, what we claim for Letters Patent is:

1. A liquid heat transfer composition comprising water and substantially pure levo-2,3-butylene glycol in proportion of about 40 parts of the water to 60 parts of the glycol by weight.

2. A process of transferring heat comprising circulating a composition consisting of water and substantially pure levo-2,3-butylene glycol through a heat transfer apparatus, the glycol comprising from 10 percent to 90 percent of the composition.

ROBERT D. COGHILL.
REID T. MILNER.